United States Patent
Menendez-Pidal et al.

(10) Patent No.: US 6,173,258 B1
(45) Date of Patent: Jan. 9, 2001

(54) METHOD FOR REDUCING NOISE DISTORTIONS IN A SPEECH RECOGNITION SYSTEM

(75) Inventors: Xavier Menendez-Pidal, Los Gatos; Miyuki Tanaka, Campbell; Ruxin Chen, San Jose; Duanpei Wu, Sunnyvale, all of CA (US)

(73) Assignees: Sony Corporation, Tokyo (JP); Sony Electronics Inc., Park Ridge, NJ (US)

(*) Notice: Under 35 U.S.C. 154(b), the term of this patent shall be extended for 0 days.

(21) Appl. No.: 09/177,461

(22) Filed: Oct. 22, 1998

Related U.S. Application Data

(60) Provisional application No. 60/099,537, filed on Sep. 9, 1998.

(51) Int. Cl.[7] .................. G10L 5/06; G10L 9/00; G10L 3/02

(52) U.S. Cl. .................. 704/233; 704/226; 704/234

(58) Field of Search .................. 704/226, 233, 704/234, 243, 240; 379/93.03, 93.12; 381/94.2, 56; 702/70–74

(56) References Cited

U.S. PATENT DOCUMENTS

| | | | |
|---|---|---|---|
| 4,284,846 | * 8/1981 | Marley | 704/231 |
| 4,592,085 | * 5/1986 | Watari et al. | 704/243 |
| 5,003,601 | 3/1991 | Watari et al. | 381/43 |
| 5,390,278 | * 2/1995 | Gupta et al. | 704/243 |
| 5,513,298 | 4/1996 | Stanford et al. | 395/2.52 |
| 5,604,839 | * 2/1997 | Acero et al. | 704/234 |
| 5,615,296 | 3/1997 | Stanford et al. | 395/2.1 |
| 5,621,859 | 4/1997 | Schwartz et al. | 395/2.65 |
| 5,715,367 | 2/1998 | Gillick et al. | 395/2.63 |
| 5,742,927 | * 4/1998 | Crozier et al. | 704/226 |

OTHER PUBLICATIONS

O'Shaughnessy, Douglas, "Speech Communication, Human and Machine," 1990, pp. 422–423.

Proakis, John and Dimitris Manolakis, "Digital Signal Processing," 1992, pp. 706–708.

Milner, Ben & Saeed Vaseghi, "Analysis of Cepstral–Time Matrices for Noise and Channel Robust Speech Recognition," 1995, pp. 519–522.

Davis, Steven & Paul Mermelstein, "Comparison of Parametric Representations for Monosyllabic Word Recognition in Continuously Spoken Sentences," 1980, pp. 353–360.

Iwahashi, N. et al., "Stochastic Features for Noise Robust Speech Recognition," 1998, pp. 633–636.

Milner, Ben, "Inclusion of Temporal Information into Features For Speech Recognition," pp. 256–259.

Hanson, Brian et al., "Spectral Dynamics for Speech Recognition under Adverse Conditions," pp. 331–356.

Neumeyer, Leonardo et al., "Training Issues and Channel Equalization Techinques for the Construction of Telephone Acoustic Models Using a High–Quality Speech Corpus," 1994, pp. 590–597.

(List continued on next page.)

Primary Examiner—Krista Zele
Assistant Examiner—Robert Louis Sax
(74) Attorney, Agent, or Firm—Gregory J. Koerner; Simon & Koerner LLP

(57) ABSTRACT

A method for reducing noise distortions in a speech recognition system comprises a feature extractor that includes a noise-suppressor, one or more time cosine transforms, and a normalizer. The noise-suppressor preferably performs a spectral subtraction process early in the feature extraction procedure. The time cosine transforms preferably operate in a centered-mode to each perform a transformation in the time domain. The normalizer calculates and utilizes normalization values to generate normalized features for speech recognition. The calculated normalization values preferably include mean values, left variances and right variances.

54 Claims, 9 Drawing Sheets

OTHER PUBLICATIONS

Tibrewala, Sangita & Hynek Hermansky, "Multi–Band and Adaptation Approaches to Robust Speech Recognition," 1997, pp. 2619–2622.

Vikki, Olli & Kari Laurila, "Noise Robust HMM–Based Speech Recognition Using Segmental Cepsrtal Feature Vector Normalization," pp. 1–4.

Nolazco Flores, J.A. & S.J. Young, "Adapting a HMM–Based Recognizer for Noisy Speech Enhanced by Spectral; Subtraction," 1993, pp. 1–30.

Chen, Ruxin et al., "A Parameter Sharing, Discrete and Continuous HMM Unified, Speech Recgnition System."

* cited by examiner

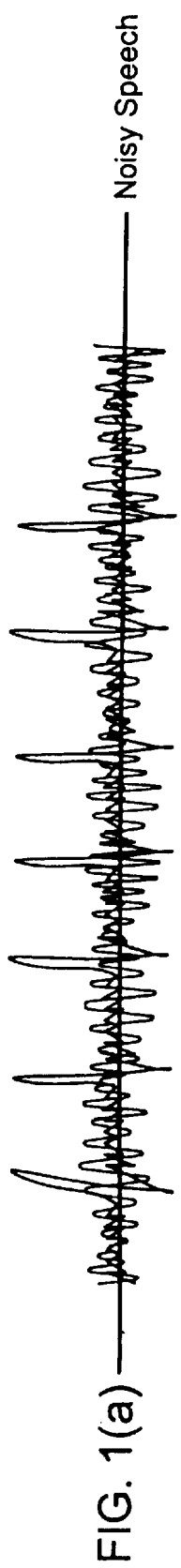
FIG. 1(a) — Noisy Speech — 112
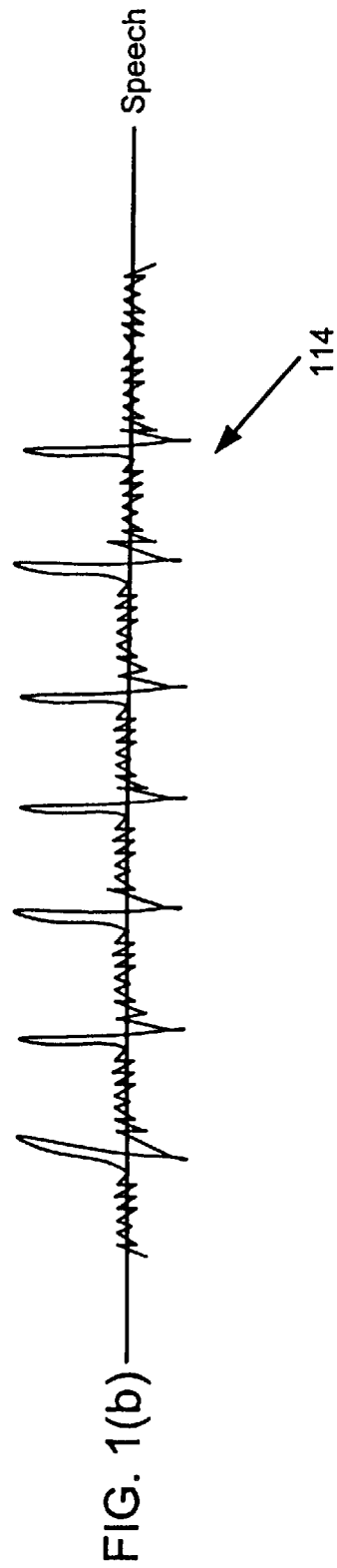
FIG. 1(b) — Speech — 114
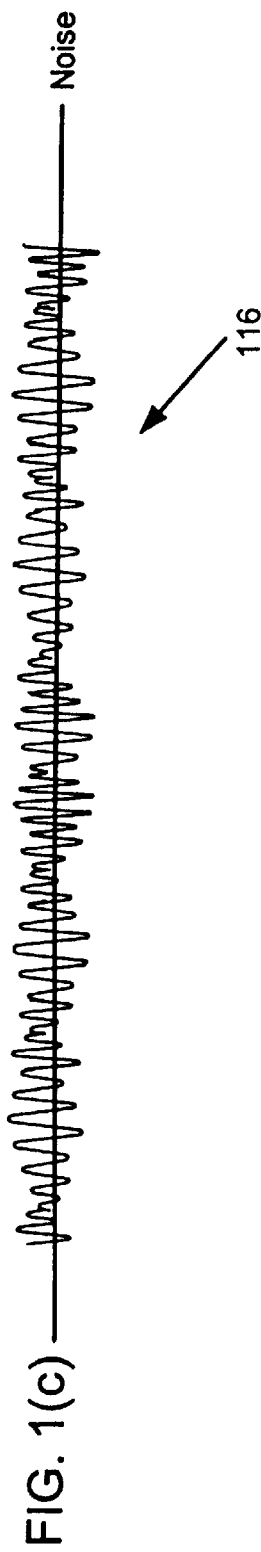
FIG. 1(c) — Noise — 116

METHOD FOR REDUCING NOISE DISTORTIONS IN A SPEECH RECOGNITION SYSTEM

CROSS-REFERENCE TO RELATED APPLICATIONS

This application is related to, and claims priority in, co-pending U.S. Provisional Patent Application Serial No. 60/099,537, entitled "Front-End Techniques To Compensate Noise And Channel Distortion For Robust Speech Recognition," filed on Sep. 9, 1998. This application is also related to co-pending U.S. patent application Ser. No. 08/957,875, entitled "Method For Implementing A Speech Recognition System For Use During Conditions With Background Noise," filed on Oct. 20, 1997, and to co-pending U.S. patent application Ser. No. 09/176,178, entitled "Method For Suppressing Background Noise In A Speech Detection System," filed on Oct. 21, 1998. All of the foregoing related applications are commonly assigned, and are hereby incorporated by reference.

BACKGROUND OF THE INVENTION

1. Field of the Invention

This invention relates generally to electronic speech recognition systems, and relates more particularly to a method for reducing noise distortions in a speech recognition system.

2. Description of the Background Art

Implementing an effective and efficient method for system users to interface with electronic devices is a significant consideration of system designers and manufacturers. Automatic speech recognition is one promising technique that allows a system user to effectively communicate with selected electronic devices, such as digital computer systems. Speech typically consists of one or more spoken utterances which each may include a single word or a series of closely-spaced words forming a phrase or a sentence.

Conditions with significant ambient background-noise levels present additional difficulties when implementing a speech recognition system. Examples of such noisy conditions may include speech recognition in automobiles or in certain manufacturing facilities. In such user applications, in order to accurately analyze a particular utterance, a speech recognition system may be required to selectively differentiate between a spoken utterance and the ambient background noise.

Referring now to FIG. 1(a), an exemplary waveform diagram for one embodiment of noisy speech 112 is shown. In addition, FIG. 1(b) depicts an exemplary waveform diagram for one embodiment of speech 114 without noise. Similarly, FIG. 1(c) shows an exemplary waveform diagram for one embodiment of noise 116 without speech 114. In practice, noisy speech 112 of FIG. 1(a) therefore is typically comprised of several components, including speech 114 of FIG. (1(b)) and noise 116 of FIG. 1(c). In FIGS. 1(a), 1(b), and 1(c), waveforms 112, 114, and 116 are presented for purposes of illustration only. The present invention may readily incorporate various other embodiments of noisy speech 112, speech 114, and noise 116.

An automatic speech recognizer typically builds a comparison database for performing speech recognition when a potential user "trains" the recognizer by providing a set of sample speech. Speech recognizers tend to significantly degrade in performance when a mismatch exists between training conditions and actual operating conditions. Such a mismatch may result from various types of acoustic distortion.

The two main sources that typically create acoustic distortion are the presence of additive noise, (such as car noise, music or background speakers), and, convolutive distortions due to the use of various different microphones, use of a telephone channel, or reverberation effects. From the foregoing discussion, it therefore becomes apparent that reducing noise distortions in a speech recognition system is a significant consideration of system designers and manufacturers of speech recognition systems.

SUMMARY OF THE INVENTION

In accordance with the present invention, a method is disclosed for reducing noise distortions in a speech recognition system. In one embodiment of the present invention, a feature extractor includes a fast Fourier transform, a noise suppressor, a filter bank, a logarithmic compressor, a frequency cosine transform, a first time cosine transform, a second time cosine transform, and a normalizer. In alternate embodiments, the feature extractor may readily be implemented using various other appropriate configurations.

In operation, the feature extractor initially receives and then provides source speech data to a fast Fourier transform (FFT) that responsively generates frequency-domain speech data by converting the source speech data from time domain to frequency domain to facilitate subsequent noise compensation. The FFT then provides the generated frequency-domain speech data to a noise suppressor that preferably performs a spectral subtraction procedure on the received frequency-domain speech data to generate noise-suppressed speech data to a filter bank.

The filter bank responsively filters the noise-suppressed speech data into channel energy, and then provides the filtered channel energy to a logarithmic compressor to be converted into logarithmic channel energy. A frequency cosine transform then converts the logarithmic channel energy into corresponding static features that are separately provided to a normalizer, to a first time cosine transform, and to a second time cosine transform.

The first time cosine transform preferably operates in a centered-mode to convert the received static features into delta features that are provided to the normalizer. Similarly, the second time cosine transform operates in a centered mode to convert the received static features into delta-delta features that are also provided to the normalizer.

The normalizer responsively performs an effective normalization procedure on the received static features to generate normalized static features to a recognizer, in accordance with the present invention. Similarly, the normalizer performs a normalization process on the received delta features to generate normalized delta features to the recognizer. The normalizer also performs a normalization process on the received delta-delta features to generate normalized delta-delta features to the recognizer.

The normalizer performs the normalization procedure by calculating and utilizing normalization values, including mean values, left variances, and right variances. The recognizer then analyzes the normalized static features, normalized delta features, and normalized delta-delta features to generate a speech recognition result, in accordance with the present invention. The present invention thus efficiently and effectively reduces noise distortions in a speech recognition system.

BRIEF DESCRIPTION OF THE DRAWINGS

FIG. 1(a) is an exemplary waveform diagram for one embodiment of noisy speech;

FIG. 1(b) is an exemplary waveform diagram for one embodiment of speech without noise;

FIG. 1(c) is an exemplary waveform diagram for one embodiment of noise without speech;

DETAILED DESCRIPTION OF THE PREFERRED EMBODIMENT

The present invention relates to an improvement in speech recognition systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention includes a method for reducing noise distortions in a speech recognition system and comprises a feature extractor that includes a noise-suppressor, one or more time cosine transforms, and a normalizer. The noise-suppressor preferably performs a spectral subtraction procedure early in the feature extraction process. The time cosine transforms preferably operate in a centered-mode to each perform a transformation in the time domain. The normalizer calculates and utilizes normalization values to generate normalized features for speech recognition. The calculated normalization values preferably include mean values, left variances and right variances.

Figure 2:
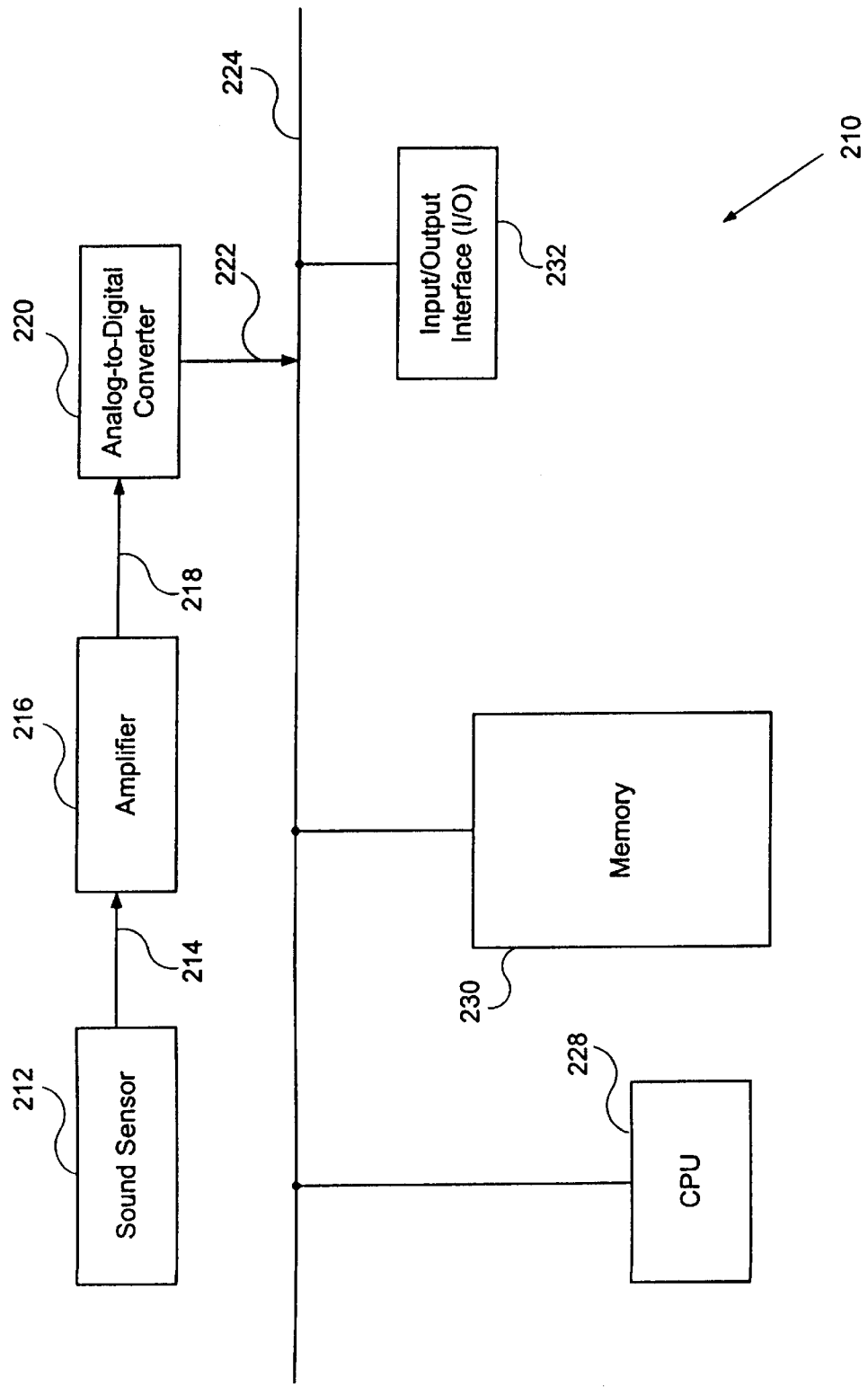
FIG. 2 is a block diagram of one embodiment for a computer system, in accordance with the present invention.

Referring now to FIG. 2, a block diagram of one embodiment for a computer system 210 is shown, in accordance with the present invention. The FIG. 2 embodiment includes a sound sensor 212, an amplifier 216, an analog-to-digital converter 220, a central processing unit (CPU) 228, a memory 230 and an input/output device 232.

In operation, sound sensor 212 detects ambient sound energy and converts the detected sound energy into an analog speech signal which is provided to amplifier 216 via line 214. Amplifier 216 amplifies the received analog speech signal and provides an amplified analog speech signal to analog-to-digital converter 220 via line 218. Analog-to-digital converter 220 then converts the amplified analog speech signal into corresponding digital speech data and provides the digital speech data via line 222 to system bus 224.

CPU 228 may then access the digital speech data on system bus 224 and responsively analyze and process the digital speech data to perform speech recognition according to software instructions contained in memory 230. The operation of CPU 228 and the software instructions in memory 230 are further discussed below in conjunction with FIGS. 3–9. After the speech data is processed, CPU 228 may then advantageously provide the results of the speech recognition analysis to other devices (not shown) via input/output interface 232.

Figure 3:
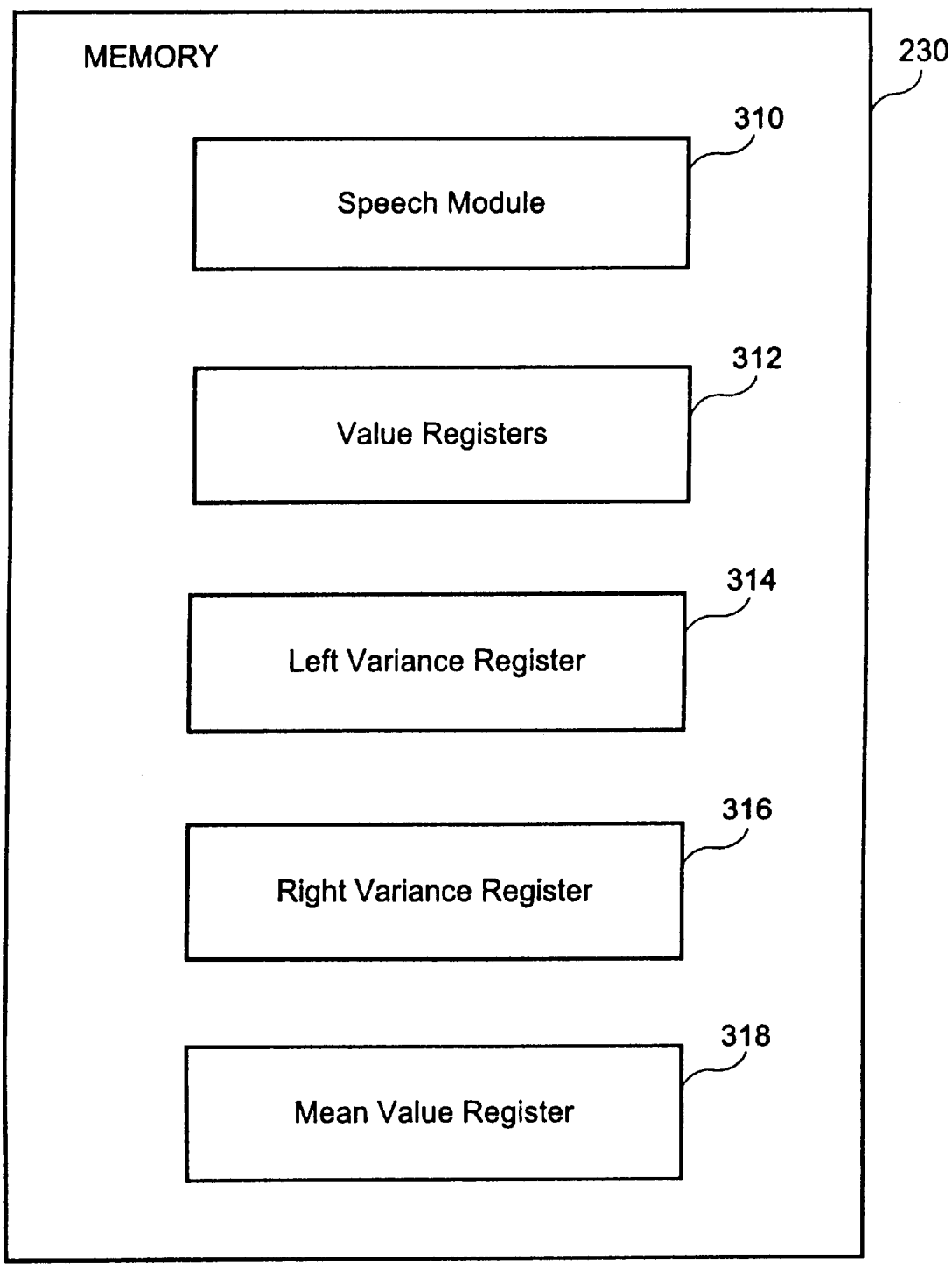
FIG. 3 is a block diagram of one embodiment for the memory of FIG. 2, in accordance with the present invention.

Referring now to FIG. 3, a block diagram of one embodiment for memory 230 of FIG. 2 is shown. Memory 230 may alternatively comprise various storage-device configurations, including Random-Access Memory (RAM) and non-volatile storage devices such as floppy-disks or hard disk-drives. In the FIG. 3 embodiment, memory 230 includes a speech module 310, value registers 312, a left variance register 314, a right variance register 316, and a mean value register 318.

In the preferred embodiment, speech module 310 includes a series of software modules which are executed by CPU 228 to analyze and detect speech data, and which are further described below in conjunction with FIGS. 4 through 9. In alternate embodiments, speech module 310 may readily be implemented using various other software and/or hardware configurations. Value registers 312, left variance register 314, right variance register 316, and mean value register 318 contain respective variable values which are calculated and utilized by speech module 310 to reduce noise distortions according to the present invention. The utilization and functionality of value registers 312, left variance register 314, right variance register 316, and mean value register 318 are further described below in conjunction with FIGS. 5 through 9.

Figure 4:
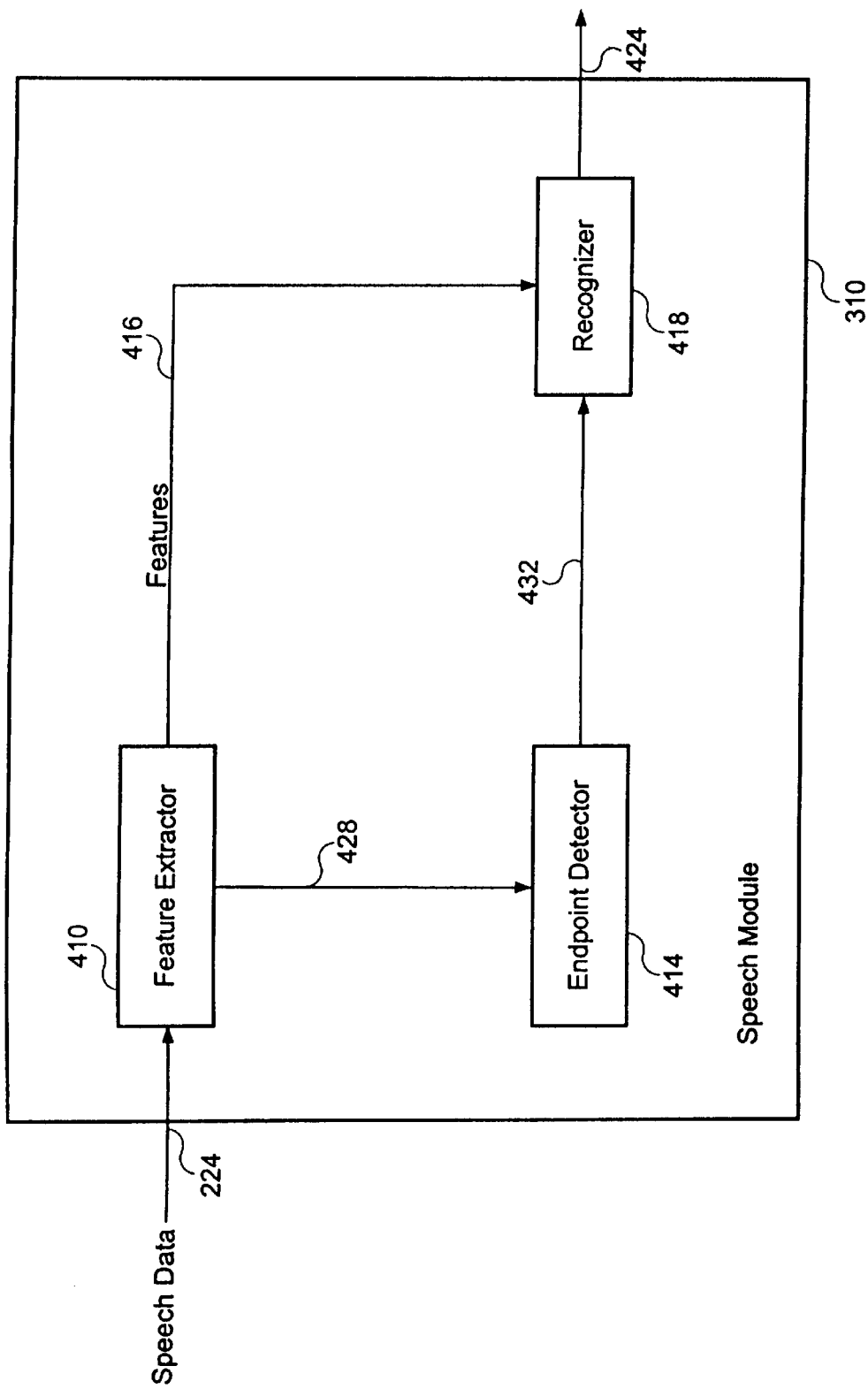
FIG. 4 is a block diagram of the one embodiment for the speech module of FIG. 3.

Referring now to FIG. 4, a block diagram of one embodiment for the FIG. 3 speech module 310 is shown. In the FIG. 3 embodiment, speech module 310 includes a feature extractor 410, an endpoint detector 414 and a recognizer 418.

In operation, analog-to-digital converter 220 (FIG. 2) provides digital speech data to feature extractor 410 within speech module 310 via system bus 224. Feature extractor 410 responsively generates normalized features which are then provided to recognizer 418 via path 416. Endpoint detector 414 analyzes speech energy received from feature extractor 410, and responsively determines endpoints (beginning and ending points) for the particular spoken utterance represented by the speech energy received via path 428. Endpoint detector 414 then provides the calculated endpoints to recognizer 418 via path 432. Recognizer 418 receives the normalized features via path 416 and the endpoints via path 432, and responsively performs a speech recognition procedure to advantageously generate a speech recognition result to CPU 228 via path 424. In the FIG. 4 embodiment, recognizer 418 may effectively be implemented as a Hidden Markov Model (HMM) recognizer.

Figure 5:
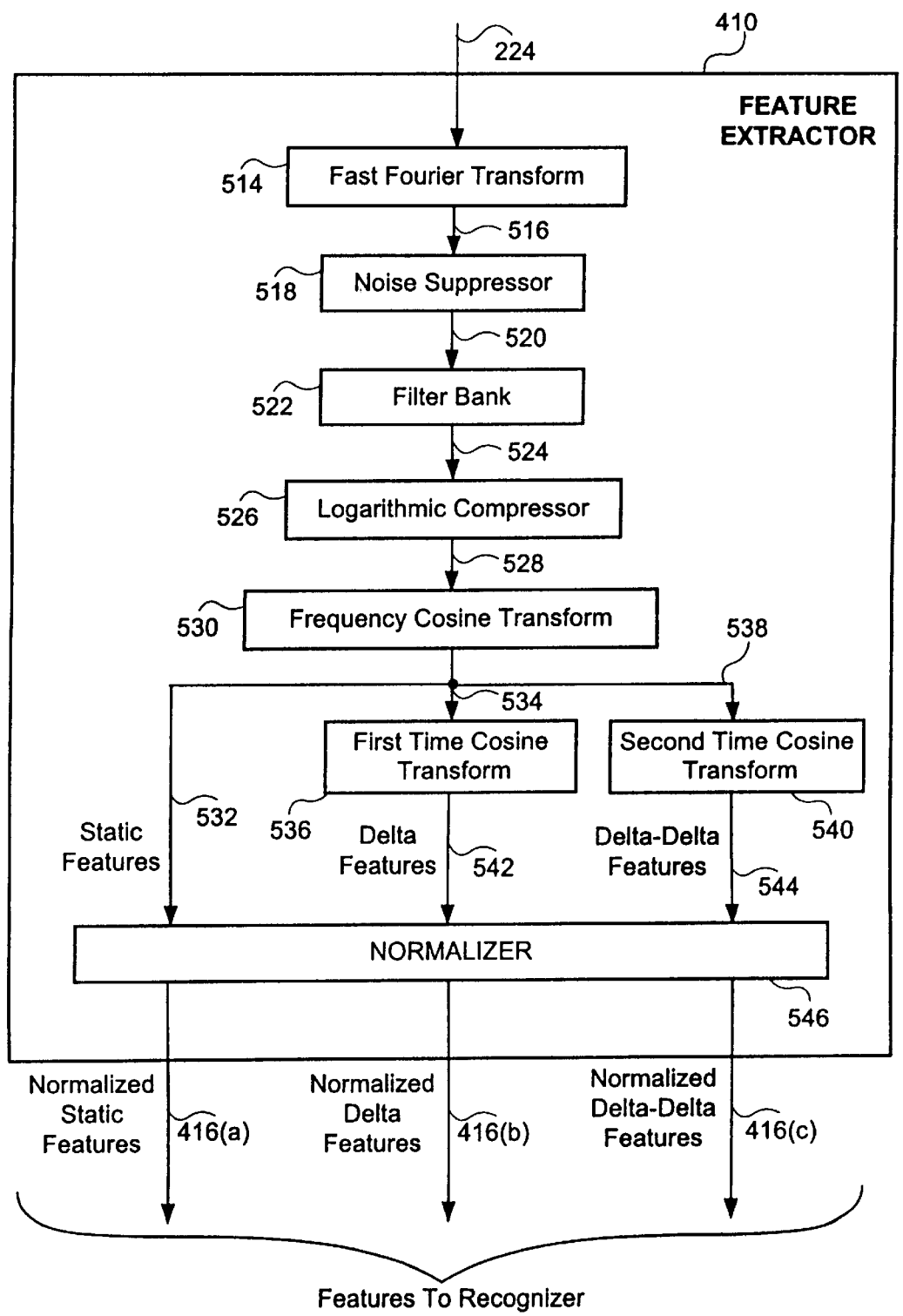
FIG. 5 is a block diagram of one embodiment for the feature extractor of FIG. 4, in accordance with the present invention.

Referring now to FIG. 5, a block diagram of one embodiment for the FIG. 4 feature extractor 410 is shown, in accordance with the present invention. In the FIG. 5 embodiment, feature extractor 410 includes a fast Fourier transform 514, a noise suppressor 518, a filter bank 522, a logarithmic compressor 526, a frequency cosine transform 530, a first time cosine transform 536, a second time cosine transform 540, and a normalizer 546. In alternate embodiments, feature extractor 410 may readily be implemented using various other appropriate configurations.

In operation, the FIG. 5 feature extractor 410 initially provides source speech data to fast Fourier transform (FFT)

514 via path 224. FFT 514 responsively generates frequency-domain speech data by converting the source speech data from time domain to frequency domain to facilitate subsequent noise compensation. Fast Fourier transforms are discussed in "Digital Signal Processing Principles, Algorithms and Applications," by John G. Proakis and Dimitris G. Manolakis, 1992, Macmillan Publishing Company, (in particular, pages 706–708) which is hereby incorporated by reference. FFT 514 then preferably provides the generated frequency-domain speech data to noise suppressor 518 via path 516.

In the FIG. 5 embodiment, noise suppressor 518 preferably performs a spectral subtraction procedure on the received frequency-domain speech data to effectively reduce noise and channel distortion. Spectral subtraction is a technique used to mitigate additive environmental noises (such as automotive, or other machine noises). The present invention utilizes spectral subtraction to reduce the effects of acoustic noises (constant tones or harmonics and moderate background noise) introduced by analog electrical transducers (microphones and transmission channels) which have poor electrical isolation or low-quality mechanical characteristics.

Noise suppression is conventionally performed at a later point in the speech recognition process. However, noise suppressor 518 advantageously applies spectral subtraction prior to the subsequent filter bank analysis to obtain a more accurate tone and harmonic noise reduction. Spectral subtraction techniques are discussed in "Adapting A HMM-Based Recogniser For Noisy Speech Enhanced By Spectral Subtraction," by J. A. Nolazco and S. J. Young, April 1993, Cambridge University (CUED/F-INFENG/TR.123), which is hereby incorporated by reference.

In one embodiment, spectral subtraction may be described by the following expression:

$$Y_D(Y) = \begin{cases} Y - \alpha N & Y - \alpha N > \beta Y \\ \beta Y & \text{otherwise} \end{cases}$$

where $Y_D(Y)$ is the higher signal-to-noise ratio or the distorted estimation of clean speech, Y is either the power or the magnitude spectrum of the noisy speech, N is an estimate of either the power or the magnitude noise spectrum, $\alpha$ is an over-estimation factor, and $\beta$ is a spectral flooring parameter. In the FIG. 5 embodiment, noise-suppressor 518 thus performs the spectral subtraction process upon the frequency-domain speech data to generate noise-suppressed speech data to filter bank 522 via path 520.

Filter bank 522 responsively filters the noise-suppressed speech data into channel energy by dividing the noise-suppressed speech data into a number of frequency sub-bands. The configuration and functionality of filter bank 522 is further discussed below in conjunction with FIG. 6. Filter bank 522 then provides the filtered channel energy to logarithmic compressor 526 via path 524. Logarithmic compressor 526 then preferably converts the filtered channel energy received from filter bank 522 into logarithmic channel energy by separately calculating the logarithm of each frequency sub-band that comprises the filtered channel energy. Logarithmic compressor 526 then provides the logarithmic channel energy to frequency cosine transform 530 via path 528.

In the FIG. 5 embodiment, frequency cosine transform 530 performs a linear transformation process that decorrelates the logarithmic channel energy received from logarithmic compressor 526. Adjacent channels of filter bank 522 may exhibit similar responses that result in disadvantageous correlations between sub-band energy values. Frequency cosine transform 530 preferably converts the channels (sub-bands) of received logarithmic channel energy into independent cepstral features that are compatible with an HMM recognizer such as the preferred embodiment of recognizer 418. The cepstral features preferably include a number of separate feature components.

The foregoing frequency cosine transform process and corresponding derivation of cepstral features are further discussed in the following references which are hereby incorporated by reference. "Speech Communication," by Douglas O'Shaughnessy, 1990, Addison-Wesley Publishing, (in particular, pages 422–423), and "Comparison Of Parametric Representations For Monosyllabic Word Recognition In Continuously Spoken Sentences," by S. B. Davis and Paul Mermelstein, 1980, IEEE.

Frequency cosine transform 530 thus converts the received logarithmic channel energy into corresponding static features which are provided to normalizer 546 via path 532. Frequency cosine transform 530 also provides the static features to first time cosine transform 536 via path 534, and to second time cosine transform 540 via path 538. In alternate embodiments of feature extractor 410, additional time cosine transforms may readily be utilized. For example, frequency cosine transform 530 may provide the static features to additional time cosine transforms, in accordance with the present invention.

First time cosine transform 536 responsively converts the received static features into delta features that are provided to normalizer 546 via path 542. Similarly, second time cosine transform 540 converts the received static features into delta-delta features that are provided to normalizer 546 via path 544. Details of the conversion process performed by first time cosine transform 536 and second time cosine transform 540 are further discussed below in conjunction with FIG. 7.

Finally, normalizer 546 performs an effective normalization process on the received static features to generate normalized static features to recognizer 418 via path 416(a), in accordance with the present invention. Similarly, normalizer 546 performs a normalization process on the received delta features to generate normalized delta features to recognizer 418 via path 416(b). Normalizer 546 also performs a normalization process on the received delta-delta features to generate normalized delta-delta features to recognizer 418 via path 416(c). The operation of normalizer 546 during the performance of the foregoing normalization processes is further discussed below in conjunction with FIGS. 8 and 9.

Figure 6:
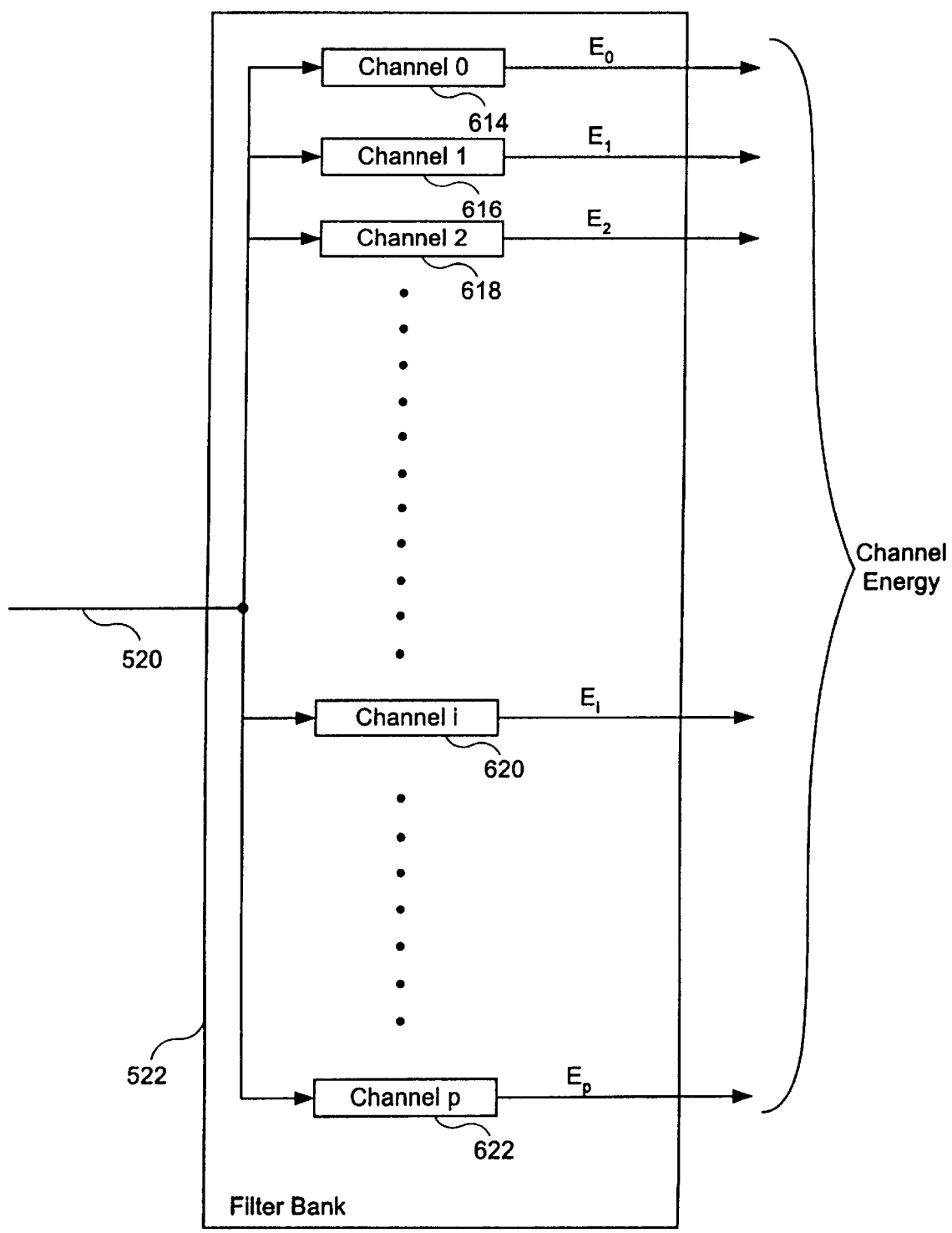
FIG. 6 is a schematic diagram of one embodiment for the filter bank of the FIG. 4 feature extractor.

Referring now to FIG. 6, a schematic diagram of one embodiment for filter bank 522 of feature extractor 410 (FIG. 4) is shown. In the preferred embodiment, filter bank 522 is a mel-frequency scaled filter bank with "p" channels (channel 0 (614) through channel p (622)). In alternate embodiments, various other implementations of filter bank 522 are equally possible.

In operation, filter bank 522 receives noise-suppressed speech data via path 520, and provides the noise-suppressed speech data in parallel to channel 0 (614) through channel p (622). In response, channel 0 (614) through channel p (622) generate respective channel energies $E_0$ through $E_p$ which collectively form the filtered channel energy provided to logarithmic compressor 526 via path 524.

Figure 7:
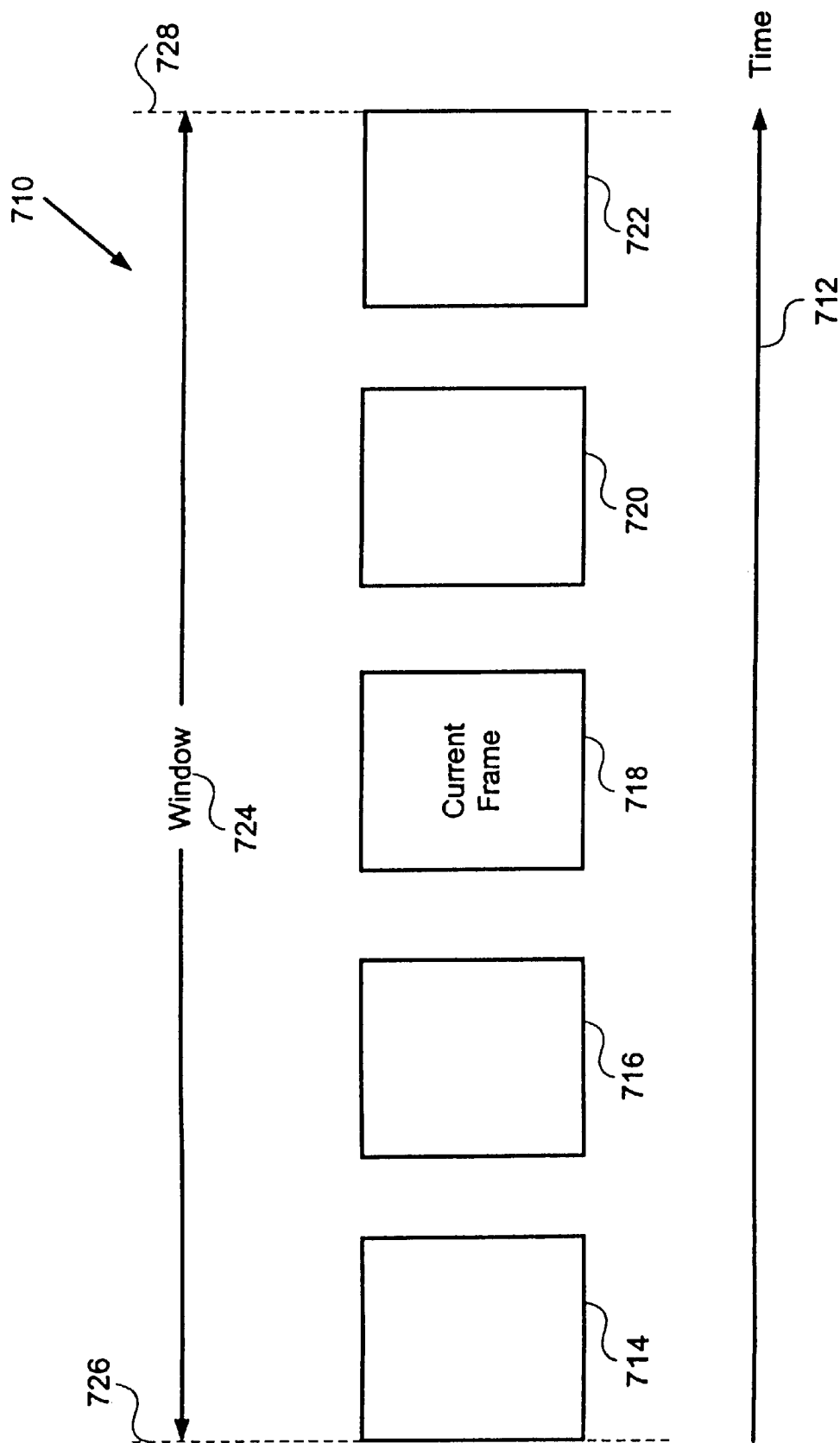
FIG. 7 is a diagram of one embodiment for a centered-mode time domain cosine transform, in accordance with the present invention.

Referring now to FIG. 7, a diagram 710 showing one embodiment for a centered-mode time domain cosine transform is shown, in accordance with the present invention. The FIG. 7 embodiment illustrates the operation of first time cosine transform 536, and also illustrates the operation of second time cosine transformer 540. The time cosine transform process and corresponding derivation of delta and delta-delta features are further discussed in the following reference which is hereby incorporated by reference. "An Analysis Of Cepstral-Time Matrices For Noise And Channel Robust Speech Recognition," by B. P. Milner and S. V. Vaseghi, 1995, ESCA.Eurospeech'95.

In the FIG. 7 embodiment, feature extractor 410 preferably processes received speech data in a series of successive data units called "frames". FIG. 7 shows a window 724 that extends from time 726 to time 728 to sequentially include a frame 714, a frame 716, a centered current frame 718, a frame 720, and a frame 722. In other embodiments of the present invention, first time cosine transform 536 and second time cosine transformer 540 may readily operate with variably-sized windows 724 containing quantities of frames other than those shown in the FIG. 7 embodiment.

First time cosine transform 536 and second time cosine transformer 540 remove the continuous component of the static cepstral features from frequency cosine transform 530 to provide linear channel and microphone invariance to the generated delta features and delta-delta features. In a phoneme-based recognizer (like the preferred embodiment of recognizer 418) elimination of the static features may significantly degrade speech recognition accuracy. In accordance with the present invention, the time-domain cosine transform is therefore used to estimate derivative features (1st, 2nd and in some cases 3rd derivatives) in combination with the static features.

Use of first time cosine transform 536 and second time cosine transform 540 in adverse conditions provides more stable derivatives in mismatched conditions (unknown channels and additive noise). The time-domain cosine transform estimates derivatives on an orthogonal basis to provide more separability and stability in adverse conditions. The estimation of derivatives (delta features and delta-delta features) using first time cosine transform 536 and second time cosine transformer 540 is preferably performed in centered-mode illustrated in FIG. 7 embodiment. In one embodiment, the process performed by first time cosine transform 536 and second time cosine transform 540 may be expressed by the following formula:

$$\frac{\partial^o}{\partial_t} C_t(p) = \sum_{k=-M}^{M} C_{t+k}(p) \cos\left(\frac{k + M + 0.5}{2M + 1} o\pi\right)$$

where $C_t(p)$ is the $p^{th}$ cepstral coefficient at time frame t, o is the derivatives order (1st, 2nd derivatives . . . ) with a value of one corresponding to the delta features and a value of two corresponding to the delta-delta features, and M is half of the window analysis used to estimate the differential coefficients.

Figure 8:
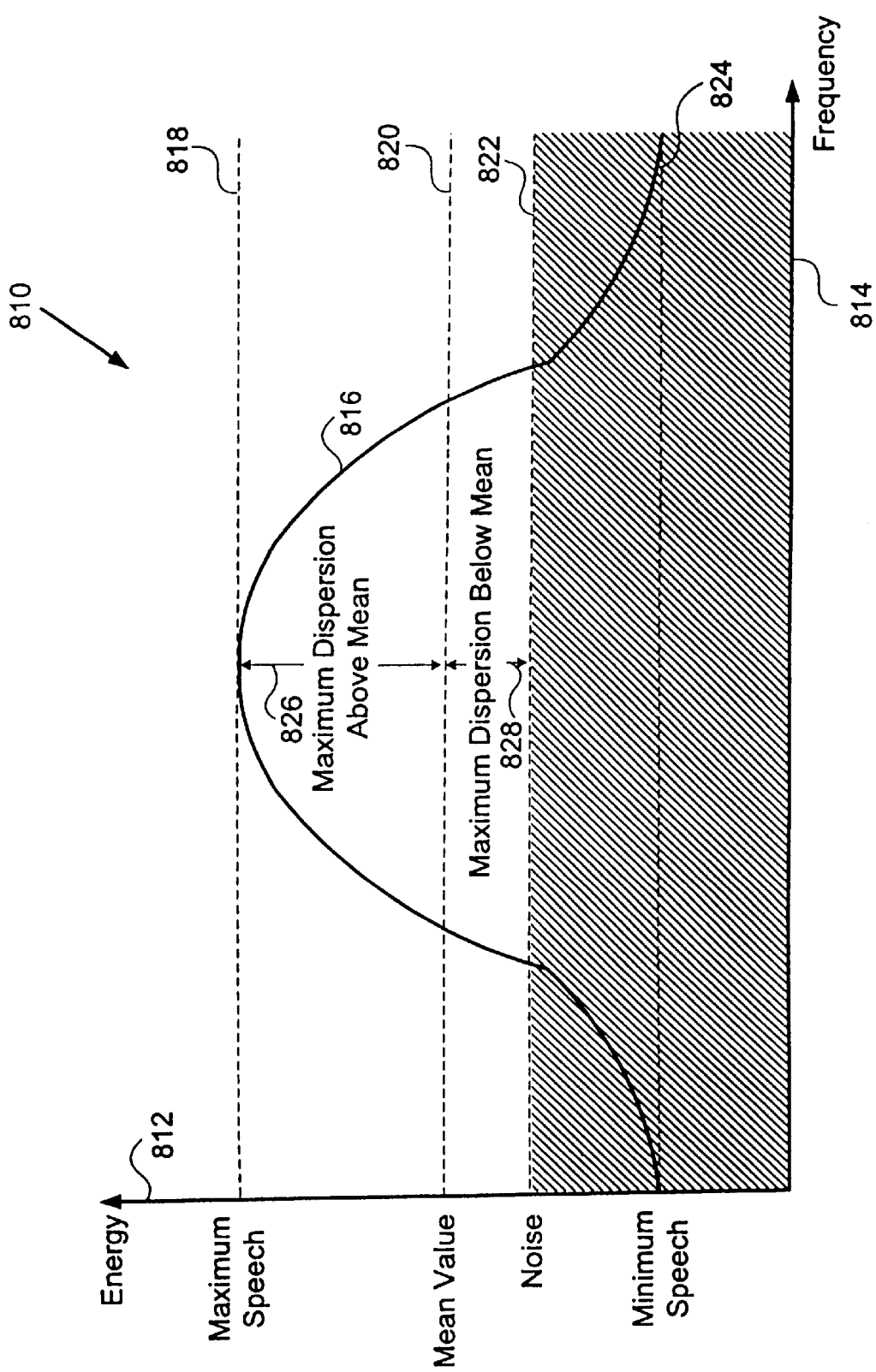
FIG. 8 is an exemplary waveform illustrating one embodiment for calculating normalization values, in accordance with the present invention.

Referring now to FIG. 8, an exemplary waveform 810 illustrating one embodiment for calculating normalization values is shown, in accordance with the present invention. The FIG. 8 waveform 810 is shown with energy magnitude represented on vertical axis 812, and with frequency shown on horizontal axis 814. The calculated normalization values preferably include mean values, right variance values, and left variance values.

The FIG. 8 waveform 810 corresponds to a single frame of speech energy 816, and preferably includes a maximum speech value 818, a mean speech value 820, a noise value 822, minimum speech value 824, a right 826 dispersion 826, and a left dispersion 828. In the preferred embodiment, a right variance is equal to an average of the right dispersion above the mean value 820 for a given number of frames. Similarly, a left variance is equal to an average of the left dispersion 828 below the mean value 820 for a given number of frames. In other embodiments, the foregoing components of waveform 810 may readily include various values other than those shown in the FIG. 8 example.

In accordance with the present invention, normalizer 546 calculates and utilizes the foregoing normalization values to perform an asymmetrical normalization technique to effectively reduce noise distortions in speech module 310. Linear channel distortions due, for example, to microphone or channel characteristics may introduce a constant shift in the cepstral features. These distortions can be eliminated by subtracting from the cepstral domain a long term average or mean value representative of the particular transmission channel used.

Furthermore, non-linear effects such as saturation distortions may be introduced by communication channels or microphones. Saturation distortions tend to flatten the spectral formant peaks, and the presence of 2nd and 3rd non-linear harmonics produce an overlap between speech formants. This second distortion may reduce the dynamic range of the cepstral features, and normalizer 546 therefore compensates by normalizing the variance of the cepstral features in a new environment.

Background noise tends to eliminate the spectral valleys and decreases the dynamic range of the cepstral features. In normalizer 546, adopted linear distortions are compensated by using a cepstral mean subtraction method. Furthermore, dynamic range decreases have been compensated by variance normalization of the cepstral and differential features used in the feature extractor 410. To provide further accuracy, an asymmetric variance is utilized to better track non-linear saturation effects and non-linear background noise masking effects. Background noise, for example, produces an asymmetric masking effect on the original energy signal representation, as shown in FIG. 8. Noise 822 masks the low amplitude areas of energy magnitude 816, but tends to have less effect on the portion of energy magnitude 816 with higher amplitude.

In the preferred embodiment, normalizer 546 may calculate the normalization values using several different methods. For example, in an off-line mode, normalizer 546 may calculate the normalization values using values from all frames of speech data. Conversely, in an on-line mode, normalizer 546 may calculate the normalization values using only existing frames of speech that are available at any particular moment in time. In the FIG. 8 embodiment, the on-line mode and off-line mode each preferably average a long term speech segment of at least two seconds in duration.

In one embodiment of the off-line mode, a mean value "a" (820) may be expressed by the following formula:

$$a = \sum_{t}^{N+P} \frac{x(t)}{N + P}$$

where x(t) is signal energy at time frame t, N is a total number of feature components associated with the left variance, and P is a total number of feature components associated with the right variance.

In one embodiment of the off-line mode, a right variance "$r_v$" (826) may be expressed by the following formula:

$$r_v = \sum_{t}^{P} \frac{x(t) - a}{P}$$

where x(t) is signal energy at time frame t and P is a total number of feature components associated with the right variance.

In one embodiment of the off-line mode, a left variance "$l_v$" (828) may be expressed by the following formula:

$$l_v = \sum_{t}^{N} \frac{a - x(t)}{N}$$

where x(t) is signal energy at time frame t and N is a total number of feature components associated with the left variance.

The on-line mode is reliable for real-time applications to avoid introducing delays in the feature extraction stage. In order to provide adaptability to new variable conditions (transmission channels, background noise or speakers), a mechanism to discard past speech data is utilized by normalizer 546 during estimation of normalization values in the on-line mode. Normalizer 546 may implement this mechanism by using a finite impulse response (FIR) filter, and evaluating the normalization value estimates over a finite window length of N frames. Alternately, normalizer 546 may implement the mechanism by using a recursive infinite impulse response (IIR) filter with a forgetting factor β. In the on-line mode, current normalization values are preferably calculated and updated by using the normalization values from the immediately-preceding frame of speech energy.

In one embodiment of the on-line mode, a current mean value "$a_i(t)$" (820) for a given feature component "i" at time frame "t" may be calculated using the following formula:

$$a_i(t) = \beta a_i(t-1) + (1-\beta) x_i(t)$$

In one embodiment of the on-line mode, a current right variance "$r_{v_i}(t)$" for a given feature component "i" at time frame "t" may be calculated using the following formula:

$$r_{v_i(t)} = \beta^r v_i(t-1) + (1-\beta)(x_i(t) - a_i(t)) \; x_i > a_i$$

where "$x_i$" is the energy of a given feature component "t".

In one embodiment of the on-line mode, a current left variance "$l_{v_i}(t)$" for a given feature component "i" at time frame "t" may be calculated using the following formula:

$$l_{v_i(t)} = \beta^l v_i(t-1) + (1-\beta)(a_i(t) - x_i(t)) \; x_i < a_i$$

where "$x_i$" is the energy of a given feature component "t". In the preferred embodiment, β equals 0.995, since this value provides a good compromise between long-term precision in a stable environment and short term adaptability when speech characteristics vary between files. In other embodiments, however, normalizer 546 may readily utilize other values of β to update the normalization values, in accordance with the present invention.

Figure 9:
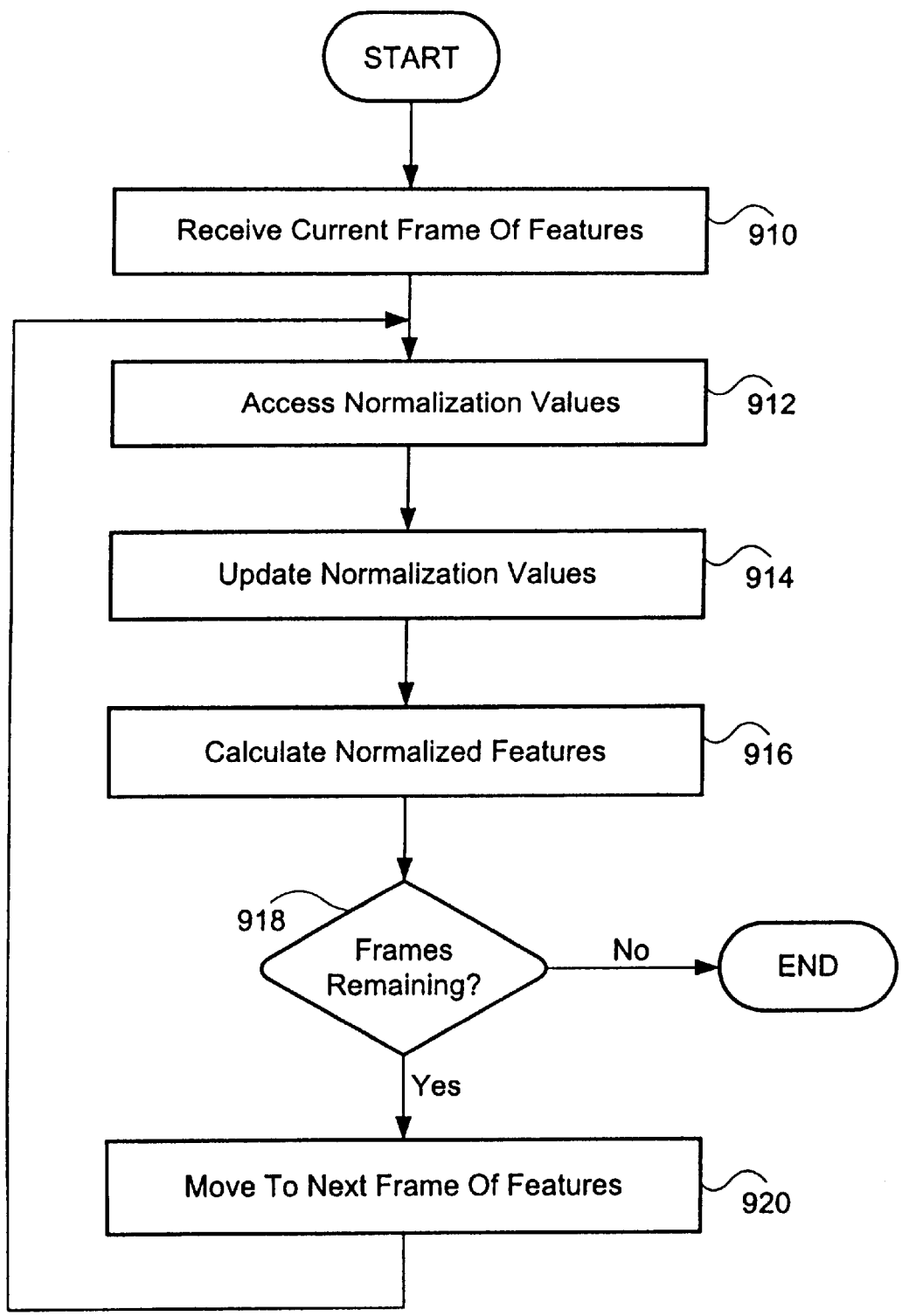
FIG. 9 is a flowchart for one embodiment of method steps to perform a normalization procedure in a speech recognition system, in accordance with the present invention.

Referring now to FIG. 9, a flowchart for one embodiment of method steps to perform a normalization procedure in a speech recognition system is shown, in accordance with the present invention. Initially, in step 910, normalizer 546 receives a current frame of features. In the preferred embodiment, normalizer 546 receives a set of static cepstral features from frequency cosine transform 530. Normalizer 546 also preferably receives a set of delta cepstral features from first time cosine transform 536, and a set of delta-delta cepstral features from second time cosine transform 540.

In step 912, normalizer 546 accesses current normalization values for performing a normalization process upon the received features. Normalization values preferably include a mean value 820 stored in mean value register 318 (FIG. 3), a left variance 828 stored in left variance register 314, and a right variance 826 stored in right variance register 316.

In step 914, normalizer 546 calculates normalized features from the received features by using the accessed normalization values. In one embodiment, whenever the current features 816 are less than the current mean value 820, then normalizer 546 utilizes the left variance 828 to calculate the normalized features which may be expressed by the following formula:

$$\overline{x}_i = \frac{a_i - x_i}{l_{v_i}} x_i < a_i$$

where $x_i$ is the "ith" component of the original feature vector, and $a_i$ and $^l v_i$, are the respective mean value and left variance of the ith feature.

Similarly, in one embodiment, whenever the current features 816 are greater than the current mean value 820, then normalizer 546 utilizes the right variance 826 to calculate the normalized features which then may be expressed by the following formula:

$$\overline{x}_i = \frac{x_i - a_i}{r_{v_i}} x_i > a_i$$

where $x_i$ is the "ith" component of the original feature vector, and $\alpha_i$ and $^r v_i$, are the respective mean value and right variance of the ith feature.

In step 916, normalizer 546 updates the normalization values stored in memory 230. In the on-line mode, normalizer 546 preferably recalculates the normalization values based on the values of the current frame of speech data. Normalizer 546 thus calculates a current mean value from the current frame, and then updates mean value register 318 with the new current mean value. Similarly, normalizer 546 calculates current left and right variances from the current frame, and then updates left and right variance register 314 and 316 with the new left and right current variance values. Calculation of normalization values is further discussed above in conjunction with FIG. 8.

In step 918, normalizer 546 determines whether any frames remain to be normalized. If frames remain, then, in step 920, normalizer 546 advances to the next frame of features, and the FIG. 9 process then loops back to step 912. However, if no frames remain to be normalized, then the FIG. 9 process terminates.

The invention has been explained above with reference to a preferred embodiment. Other embodiments will be apparent to those skilled in the art in light of this disclosure. For example, the present invention may readily be implemented using configurations and techniques other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for reducing noise distortions in speech data, comprising:
   a feature extractor configured to perform a manipulation process on said speech data, wherein said feature extractor is comprised of:
   a noise suppressor that performs a spectral subtraction procedure on said speech data, which is expressed by a formula:

$$Y_D(Y) = \begin{cases} Y - \alpha N & Y - \alpha N > \beta Y \\ \beta Y & \text{otherwise} \end{cases}$$

where $Y_D(Y)$ is a signal-to-noise ratio or a distorted estimation of clean speech, Y is a power or magnitude spectrum of noisy speech, N is an estimate of a power or magnitude noise spectrum, $\alpha$ is an over-estimation factor, and $\beta$ is a spectral flooring parameter; and
   a first time cosine transform that converts said static features into delta features, and a second time cosine transform that converts said static features into delta-delta features, wherein said first time cosine transform and said second time cosine transform each perform a centered-mode time cosine transform procedure that may be expressed by a following formula:

$$\frac{\partial^o}{\partial_t} C_t(p) = \sum_{k=-M}^{M} C_{t+k}(p) \cos\left(\frac{k + M + 0.5}{2M + 1} o\pi\right)$$

where $C_t(p)$ is a $p^{th}$ cepstral coefficient at a time frame t, M is half of a window size used to estimate differential coefficients, and o is a derivatives order with a value of one when corresponding to said delta features and a value of two when corresponding to said delta-delta features.

2. The system of claim 1 wherein said feature extractor is part of a speech module configured to analyze and manipulate said speech data.

3. The system of claim 1 wherein said feature extractor includes program instructions that are stored in a memory device coupled to said processor.

4. The system of claim 1 wherein said feature extractor further includes a normalizer configured to perform a normalization procedure on said speech data.

5. The system of claim 2 wherein said speech data includes digital source speech data that is provided to said speech module by an analog sound sensor and an analog-to-digital converter.

6. The system of claim 5 wherein said digital source speech data is converted to frequency-domain speech data by a fast Fourier transform.

7. The system of claim 5 wherein a filter bank generates filtered channel energy by separating said noise-suppressed speech data into discrete frequency channels.

8. The system of claim 7 wherein said filtered channel energy is converted into logarithmic channel energy by a logarithmic compressor.

9. The system of claim 8 wherein said logarithmic channel energy is converted into static features by a frequency cosine transform.

10. The system of claim 9 wherein said static features are cepstral features that decorrelate said channels in said logarithmic channel energy.

11. A system for reducing noise distortions in audio data, comprising:
    a feature extractor configured to perform a manipulation process on said audio data; and
    a processor configured to control said feature extractor, wherein said feature extractor generates static cepstral features, a first centered-mode time cosine transform converts said static cepstral features into delta cepstral features, and a second centered-mode time cosine transform converts said static cepstral features into delta-delta cepstral features, and wherein said feature extractor performs a normalization procedure to convert said static cepstral features into normalized static cepstral features, to convert said delta cepstral features into normalized delta cepstral features, and to convert said delta-delta cepstral features into normalized delta-delta cepstral features.

12. A system for reducing noise distortions in audio data, comprising:
    a feature extractor configured to perform a manipulation process on said audio data; and
    a processor configured to control said feature extractor, said feature extractor including a first time cosine transform that converts said static features into delta features, and a second time cosine transform that converts said static features into delta-delta features, wherein said first time cosine transform and said second time cosine transform each perform a centered-mode time cosine transform procedure that may be expressed by a following formula:

$$\frac{\partial^o}{\partial_t} C_t(p) = \sum_{k=-M}^{M} C_{t+k}(p) \cos\left(\frac{k + M + 0.5}{2M + 1} o\pi\right)$$

where $C_t(p)$ is a $p^{th}$ cepstral coefficient at a time frame t, M is half of a window size used to estimate differential coefficients, and o is a derivatives order with a value of one when corresponding to said delta features and a value of two when corresponding to said delta-delta features.

13. The system of claim 4 wherein said normalization procedure converts said static features into normalized static features, converts said delta features into normalized delta features, and converts said delta-delta features into normalized delta-delta features.

14. The system of claim 13 wherein said normalized static features, said normalized delta features, and said normalized delta-delta features are provided to a recognizer that responsively generates a speech recognition result.

15. A system for reducing noise distortions in audio data, comprising:
    a feature extractor configured to perform a manipulation process on said audio data; and
    a processor configured to control said feature extractor, wherein said feature extractor generates features, and a normalizer uses normalization values to perform a normalization procedure, said normalization values including a mean value, a left variance, and a right variance, said mean value being an average energy for a frame of feature energy, said right variance being a difference between said mean value and a maximum energy for said frame, and said left variance being a difference between said mean value and a noise level for said frame.

16. The system of claim 15 wherein, when a current energy for said frame is less than said mean value, said normalization procedure may be expressed by a formula:

$$\bar{x}_i = \frac{a_i - x_i}{l_{v_i}} \quad x_i < a_i$$

where $x_i$ is an "ith" component of an original feature vector, and $a_i$ and $^l v_i$, are a respective mean value and a left variance of said ith component.

17. The system of claim 15 wherein, when a current energy for said frame is greater than said mean value, said normalization procedure may be expressed by a following formula:

$$\bar{x}_i = \frac{x_i - a_i}{r_{v_i}} \quad x_i > a_i$$

where $x_i$ is an "ith" component of an original feature vector, and $a_i$ and $^r v_i$, are a respective mean value and a right variance of said ith component.

18. The system of claim 15 wherein said mean value is calculated in an off-line mode and is expressed by a formula:

$$a = \sum_t^{N+P} \frac{x(t)}{N+P}$$

where x(t) is a signal energy at a time frame t, N is a total number of feature components associated with said left variance, and P is a total number of feature components associated with said right variance.

19. The system of claim 15 wherein said right variance is calculated in an off-line mode and is expressed by a formula:

$$r_v = \sum_t^P \frac{x(t) - a}{P}$$

where x(t) is a signal energy at a time frame t and P is a total number of feature components associated with said right variance.

20. The system of claim 15 wherein said left variance is calculated in an off-line mode and is expressed by a formula:

$$l_v = \sum_t^N \frac{a - x(t)}{N}$$

where x(t) is a signal energy at a time frame t and N is a total number of feature components associated with said left variance.

21. The system of claim 15 wherein said mean value for a given feature component "t" at a time frame "t" is calculated in an on-line mode and is expressed by a formula:

$$a_i(t) = \beta a_i(t-1) + (1-\beta) x_i(t)$$

where $\beta$ is a forgetting factor.

22. The system of claim 15 wherein said right variance "$r_{v_i}(t)$" for a given feature component "t" at a time frame "t" is calculated in an on-line mode and is expressed by a formula:

$$r_{v_i(t)} = \beta^r v_i(t-1) + (1-\beta)(x_i(t) - a_i(t)) \quad x_i > a_i$$

where "$x_i$" is energy of a given feature component "t", and where $\beta$ is a forgetting factor.

23. The system of claim 15 wherein said left variance "$l_{v_i}(t)$" for a given feature component "t" at a time frame "t" is calculated in an on-line mode and is expressed by a formula:

$$l_{v_i(t)} = \beta^l v_i(t-1) + (1-\beta)(a_i(t) - x_i(t)) \quad x_i < a_i$$

where "$x_i$" is energy of a given feature component "t", and where $\beta$ is a forgetting factor.

24. The system of claim 21 wherein said forgetting factor of $\beta$ is equal to a value of 0.995.

25. A method for reducing noise distortions in speech data, comprising the steps of:
  suppressing noise in said speech data using a spectral subtraction procedure that is expressed by a formula:

$$Y_D(Y) = \begin{cases} Y - \alpha N & Y - \alpha N > \beta Y \\ \beta Y & \text{otherwise} \end{cases}$$

where $Y_D(Y)$ is a signal-to-noise ratio or a distorted estimation of clean speech, Y is a power or magnitude spectrum of noisy speech, N is an estimate of a power or magnitude noise spectrum, $\alpha$ is an over-estimation factor, and $\beta$ is a spectral flooring parameter; and
  converting said static features into delta features using a first time cosine transform, and converting said static features into delta-delta features using a second time cosine transform, wherein said first time cosine transform and said second time cosine transform each perform a centered-mode time cosine transform procedure that may be expressed by a following formula:

$$\frac{\partial^o}{\partial_t} C_t(p) = \sum_{k=-M}^{M} C_{t+k}(p) \cos\left(\frac{k + M + 0.5}{2M + 1} o\pi\right)$$

where $C_t(p)$ is a $p^{th}$ cepstral coefficient at a time frame t, M is half of a window size used to estimate differential coefficients, and o is a derivatives order with a value of one when corresponding to said delta features and a value of two when corresponding to said delta-delta features.

26. The method of claim 25 wherein said feature extractor includes program instructions that are stored in a memory device coupled to said processor.

27. The method of claim 25 wherein said feature extractor is part of a speech module configured to analyze and manipulate said speech data.

28. The method of claim 27 wherein said speech data includes digital source speech data that is provided to said speech module by an analog sound sensor and an analog-to-digital converter.

29. The method of claim 28 wherein said digital source speech data is converted to frequency-domain speech data by a fast Fourier transform.

30. The method of claim 29 wherein a filter bank generates filtered channel energy by separating said noise-suppressed speech data into discrete frequency channels.

31. The method of claim 30 wherein said filtered channel energy is converted into logarithmic channel energy by a logarithmic compressor.

32. The method of claim 31 wherein said logarithmic channel energy is converted into static features by a frequency cosine transform.

33. The method of claim 32 wherein said static features are cepstral features that decorrelate said channels in said logarithmic channel energy.

34. The method of claim 25 further comprising the step of performing a normalization procedure on said speech data.

35. The method of claim 34 wherein said step of performing a normalization procedure comprises the steps of converting said static features into normalized static features, converting said delta features into normalized delta features, and converting said delta-delta features into normalized delta-delta features.

36. A method for reducing noise distortions in audio data, comprising the steps of:
performing a manipulation process on said audio data using a feature extractor;
controlling said feature extractor with a processor to thereby reduce said noise distortions, wherein said feature extractor generates static cepstral features, a first centered-mode time cosine transform converts said static cepstral features into delta cepstral features, and a second centered-mode time cosine transform converts said static cepstral features into delta-delta cepstral features, and wherein said feature extractor converts said static cepstral features into normalized static cepstral features, converts said delta cepstral features into normalized delta cepstral features, and converts said delta-delta cepstral features into normalized delta-delta cepstral features.

37. The method of claim 36 wherein a normalizer performs a normalization procedure to convert said static features into normalized static features, to convert said delta features into normalized delta features, and to convert said delta-delta features into normalized delta-delta features.

38. The method of claim 37 wherein said normalized static features, said normalized delta features, and said normalized delta-delta features are provided to a recognizer that responsively generates a speech recognition result.

39. The method of claim 38 wherein said recognizer is a Hidden Markoff Model recognizer.

40. A method for reducing noise distortions in audio data, comprising the steps of:
performing a manipulation process on said audio data using a feature extractor; and
controlling said feature extractor with a processor to thereby reduce said noise distortions, said feature extractor including a first time cosine transform that converts said static features into delta features, and a second time cosine transform that converts said static features into delta-delta features, wherein said first time cosine transform and said second time cosine transform each perform a centered-mode time cosine transform procedure that may be expressed by a following formula:

$$\frac{\partial^o}{\partial_t} C_t(p) = \sum_{k=-M}^{M} C_{t+k}(p) \cos\left(\frac{k+M+0.5}{2M+1} o\pi\right)$$

where $C_t(p)$ is a $p^{th}$ cepstral coefficient at a time frame t, M is half of a window size used to estimate differential coefficients, and o is a derivatives order with a value of one when corresponding to said delta features and a value of two when corresponding to said delta-delta features.

41. A method for reducing noise distortions in audio data, comprising the steps of:
performing a manipulation process on said audio data using a feature extractor; and
controlling said feature extractor with a processor to thereby reduce said noise distortions, wherein said feature extractor generates features, and a normalizer uses normalization values to perform a normalization procedure, said normalization values including a mean value, a left variance, and a right variance, said mean value being an average energy magnitude of feature energy, said right variance being an average right dispersion above said mean value, and said left variance being an average left dispersion below said mean value.

42. The method of claim 41 wherein, when a current energy for said frame is less than said mean value, said normalization procedure may be expressed by a formula:

$$\bar{x}_i = \frac{a_i - x_i}{l_{v_i}} x_i < a_i$$

where $x_i$ is an "ith" component of an original feature vector, and $a_i$ and $^l v_i$, are a respective mean value and a left variance of said ith component.

43. The method of claim 41 wherein, when a current energy for said frame is greater than said mean value, said normalization procedure may be expressed by a following formula:

$$\bar{x}_i = \frac{x_i - a_i}{r_{v_i}} x_i > a_i$$

where $x_i$ is an "ith" component of an original feature vector, and $a_i$ and $^r v_i$, are a respective mean value and a right variance of said ith component.

44. The method of claim 41 wherein said mean value is calculated in an off-line mode and is expressed by a formula:

$$a = \sum_{t}^{N+P} \frac{x(t)}{N+P}$$

where x(t) is a signal energy at a time frame t, N is a total number of feature components associated with said left variance, and P is a total number of feature components associated with said right variance.

45. The method of claim 41 wherein said right variance is calculated in an off-line mode and is expressed by a formula:

$$r_v = \sum_{t}^{P} \frac{x(t) - a}{P}$$

where x(t) is a signal energy at a time frame t and P is a total number of feature components associated with said right variance.

46. The method of claim 41 wherein said left variance is calculated in an off-line mode and is expressed by a formula:

$$l_v = \sum_{t}^{N} \frac{a - x(t)}{N}$$

where x(t) is a signal energy at a time frame t and N is a total number of feature components associated with said left variance.

47. The method of claim 41 wherein said right variance "$r_{v_i}(t)$" for a given feature component "t" at a time frame "t" is calculated in an on-line mode and is expressed by a formula:

$$r_{v_i(t)} = \beta^r v_i(t-1) + (1-\beta)(x_i(t) - a_i(t)) \; x_i > a_i$$

where "$x_i$" is energy of a given feature component "t", and where $\beta$ is a forgetting factor.

48. The method of claim 41 wherein said left variance "$l_{v_i}(t)$" for a given feature component "t" at a time frame "t" is calculated in an on-line mode and is expressed by a formula:

$$l_{v_i(t)} = \beta^1 v_i(t-1) + (1-\beta)(a_i(t)-x_i(t)) \quad x_i < a_i$$

where "$x_t$" is energy of a given feature component "t", and where $\beta$ is a forgetting factor.

49. The method of claim 41 wherein said mean value for a given feature component "t" at a time frame "t" is calculated in an on-line mode and is expressed by a formula:

$$a_i(t) = \beta a_i(t-1) + (1-\beta)x_i(t)$$

where $\beta$ is a forgetting factor.

50. The method of claim 49 wherein said forgetting factor of $\beta$ is equal to a value of 0.95.

51. A computer-readable medium comprising program instructions for reducing noise distortions in audio data by performing the steps of:

performing a manipulation process on said audio data using a feature extractor; and controlling said feature extractor with a processor to thereby reduce said noise distortions, wherein said feature extractor generates static cepstral features, a first centered-mode time cosine transform converts said static cepstral features into delta cepstral features, and a second centered-mode time cosine transform converts said static cepstral features into delta-delta cepstral features, and wherein said feature extractor converts said static cepstral features into normalized static cepstral features, converts said delta cepstral features into normalized delta cepstral features, and converts said delta-delta cepstral features into normalized delta-delta cepstral features.

52. The computer readable medium of claim 51 wherein said feature extractor further performs a spectral substraction procedure on said audio data.

53. A system for reducing noise distortions in audio data, comprising:

means for performing a manipulation process on said audio data using a feature extractor; and means for controlling said feature extractor to thereby reduce said noise distortions, wherein said feature extractor generates static cepstral features, a first centered-mode time cosine transform converts said static cepstral features into delta cepstral features, and a second centered-mode time cosine transform converts said static cepstral features into delta-delta cepstral features, and wherein said feature extractor converts said static cepstral features into normalized static cepstral features, converts said delta cepstral features into normalized delta cepstral features, and converts said delta-delta cepstral features into normalized delta-delta cepstral features.

54. The system of claim 53 wherein said feature extractor further performs a spectral subtraction procedure on said audio data.

* * * * *